(12) United States Patent
Hagiwara

(10) Patent No.: US 8,373,760 B2
(45) Date of Patent: Feb. 12, 2013

(54) IMAGE CAPTURING DEVICE SUITABLE FOR PHOTOGRAPHING A PERSON

(75) Inventor: Kazuaki Hagiwara, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 359 days.

(21) Appl. No.: 12/720,169

(22) Filed: Mar. 9, 2010

(65) Prior Publication Data

US 2010/0231753 A1 Sep. 16, 2010

(30) Foreign Application Priority Data

Mar. 11, 2009 (JP) .................................. 2009-058312

(51) Int. Cl.
*H04N 9/04* (2006.01)

(52) U.S. Cl. ............. 348/207.99; 348/211.1; 348/211.2; 348/211.4

(58) Field of Classification Search ............... 348/211.1, 348/211.2, 211.3, 211.4, 207.99, 169, 77, 348/208.12, 208.13
See application file for complete search history.

(56) References Cited

U.S. PATENT DOCUMENTS

| | | | | |
|---|---|---|---|---|
| 2006/0251299 | A1* | 11/2006 | Kinjo | 382/118 |
| 2009/0131106 | A1* | 5/2009 | Itoh et al. | 455/556.1 |
| 2009/0135269 | A1 | 5/2009 | Nozaki et al. | |

FOREIGN PATENT DOCUMENTS

| | | | |
|---|---|---|---|
| CN | 101313565 | A | 11/2008 |
| JP | 11-187351 | A | 7/1999 |
| JP | 2003-169247 | A | 6/2003 |
| JP | 2003-274271 | A | 9/2003 |
| JP | 2005-073201 | A | 3/2005 |
| JP | 2005-086516 | A | 3/2005 |
| JP | 2007-074141 | A | 3/2007 |
| JP | 2007-150604 | A | 6/2007 |
| JP | 2007-274264 | A | 10/2007 |
| JP | 2008-079229 | A | 4/2008 |
| JP | 2009-049886 | A | 3/2009 |

OTHER PUBLICATIONS

Chinese Office Action dated Sep. 1, 2011 (and a partial English translation thereof) in counterpart Chinese Application No. 201010134311.9.
Japanese Office Action dated Jan. 11, 2011 and English translation thereof, issued in counterpart Japanese Application No. 2009-058312.

(Continued)

Primary Examiner — Yogesh Aggarwal
(74) Attorney, Agent, or Firm — Holtz, Holtz, Goodman & Chick, PC

(57) ABSTRACT

A digital camera 1 comprising a key operation unit (27) for registering subject information for identifying the subject, and photography conditions or image processing conditions corresponding to the subject identified according to the subject information; image memory (31) for storing the subject information, and the photography conditions or image processing conditions registered by the key operation unit (27); and a CPU (20). The CPU (20) detects a characteristic portion of the subject from the acquired image, identifies a subject corresponding to the characteristic portion of the detected subject, by referring to the subject information stored in the image memory (31), acquires the photography conditions or image processing conditions corresponding to the identified subject identified from the image memory (31), and carries out image capturing or image processing based on the acquired photography conditions or image processing conditions. In this way, an image capturing device capable of easily carrying out image processing in accordance with individual preferences is provided.

9 Claims, 8 Drawing Sheets

OTHER PUBLICATIONS

Japanese Office Action dated Mar. 29, 2011 (and English translation thereof) in counterpart Japanese Application No. 2009-058312.

Korean Office Action dated May 13, 2011 (and English translation thereof) in counterpart Korean Application No. 10-2010-0016729.

* cited by examiner

IMAGE CAPTURING DEVICE SUITABLE FOR PHOTOGRAPHING A PERSON

This application is based on and claims the benefit of priority from Japanese Patent Application No. 2009-058312, filed on 11 Mar. 2009, the content of which is incorporated herein by reference.

BACKGROUND OF THE INVENTION

1. Field of the Invention

The present invention relates to an image capturing device capable of automatically setting photography conditions suitable for photographing a person.

2. Related Art

Conventionally, there are such image capturing devices as a digital camera or a video camera that can photograph a subject such as a person or the like and acquire a still image thereof.

Furthermore, image capturing devices in which it is possible to carry out such image processing as edge emphasis, brightness adjustment, hue adjustment and the like on an image acquired from the person captured as a subject are also known (for example, see Japanese Patent Laid-Out Publication No. H11-187351). Since a person captured as a subject can carry out image processing on the captured image in accordance with conditions reflecting individual preferences, after the image is captured, an image desired by each individual can be acquired.

However, for such image capturing devices, although it is possible to carry out image processing on the image acquired by image capturing, in accordance with conditions desired by a user who is to become a subject, it is necessary to perform image processing each time photographing, which is cumbersome. Furthermore, since there exist many objects for a subject to be captured by an image capturing device, such as not just an owner, but family or friends thereof, in particular, if someone other than the owner of the image capturing device is the subject, then each time photography is to be carried out, an operation for image processing in accordance with conditions desired by a person who is a subject becomes even more cumbersome.

SUMMARY OF THE INVENTION

A first aspect of the present is characterized by comprising: an image capturing unit for capturing an image of a subject, a registration unit for newly registering subject information for identifying the subject, and photography conditions or image processing conditions corresponding to the subject identified according to the subject information, a storage unit for storing the subject information, and the photography conditions or the image processing conditions, newly registered by the registration unit, to be in association with one another, a characteristic portion detection unit for detecting a characteristic portion of the subject from the image captured by way of the image capturing unit, a subject identification unit for identifying a subject corresponding to the characteristic portion of the subject detected by way of the characteristic portion detection unit, by referring to the subject information stored in the storage unit, a condition acquisition unit for acquiring, from the storage unit, the photography conditions or the image processing conditions corresponding to the subject identified by way of the subject identification unit, and a control unit for carrying out image capturing by way of the image capturing unit based on the photography conditions or causing image processing to be carried out on an image image-captured, based on the image processing conditions acquired by way of the condition acquisition unit.

Another aspect of the present is characterized by comprising: an image capturing step of capturing an image of a subject, a registration step of newly registering subject information for identifying the subject in the image, and photography conditions or image processing conditions corresponding to the subject identified according to the subject information, a storage step of storing subject-related information specifying an association among the subject information, and the photography conditions or the image processing conditions, newly registered in the registration step, to be in association with one another, a characteristic portion detection step of detecting a characteristic portion of the subject from the image captured in the image capturing step, a subject identification step of identifying a subject corresponding to the characteristic portion of the subject detected in the characteristic portion detection step, by referring to the subject information stored in the storage step, a condition acquisition step of acquiring, from the subject-related information stored in the storage step, the photography conditions or the image processing conditions corresponding to the subject identified in the subject identification step, and a control step of carrying out image capturing in the image capturing step based on the photography conditions acquired in the condition acquisition step or causing image processing to be carried out on an image image-captured in the image processing step, based on the image processing conditions acquired in the condition acquisition step.

Another aspect of the present is characterized by enabling a computer provided with an image capturing device to function as: an image capturing unit for capturing an image of a subject, a registration unit for newly registering subject information for identifying the subject in the image, and photography conditions or image processing conditions corresponding to the subject identified according to the subject information, a storage unit for storing the subject information, and the photography conditions or image processing conditions, newly registered by way of the registration unit, to be in association with one another, a characteristic portion detection unit for detecting a characteristic portion of the subject from the image captured by way of the image capturing unit, a subject identification unit for identifying a subject corresponding to the characteristic portion of the subject detected by way of the characteristic portion detection unit, by referring to the subject information stored in the storage unit, a condition acquisition unit for acquiring, from the storage unit, the photography conditions or the image processing conditions corresponding to the subject identified by way of the subject identification unit, and a control unit for carrying out image capturing by way of the image capturing unit based on the photography conditions acquired by way of the condition acquisition unit or causing image processing to be carried out on an image image-captured, based on the image processing conditions acquired by way of the condition acquisition unit.

DETAILED DESCRIPTION OF THE INVENTION

Electric Configuration

Figure 1:
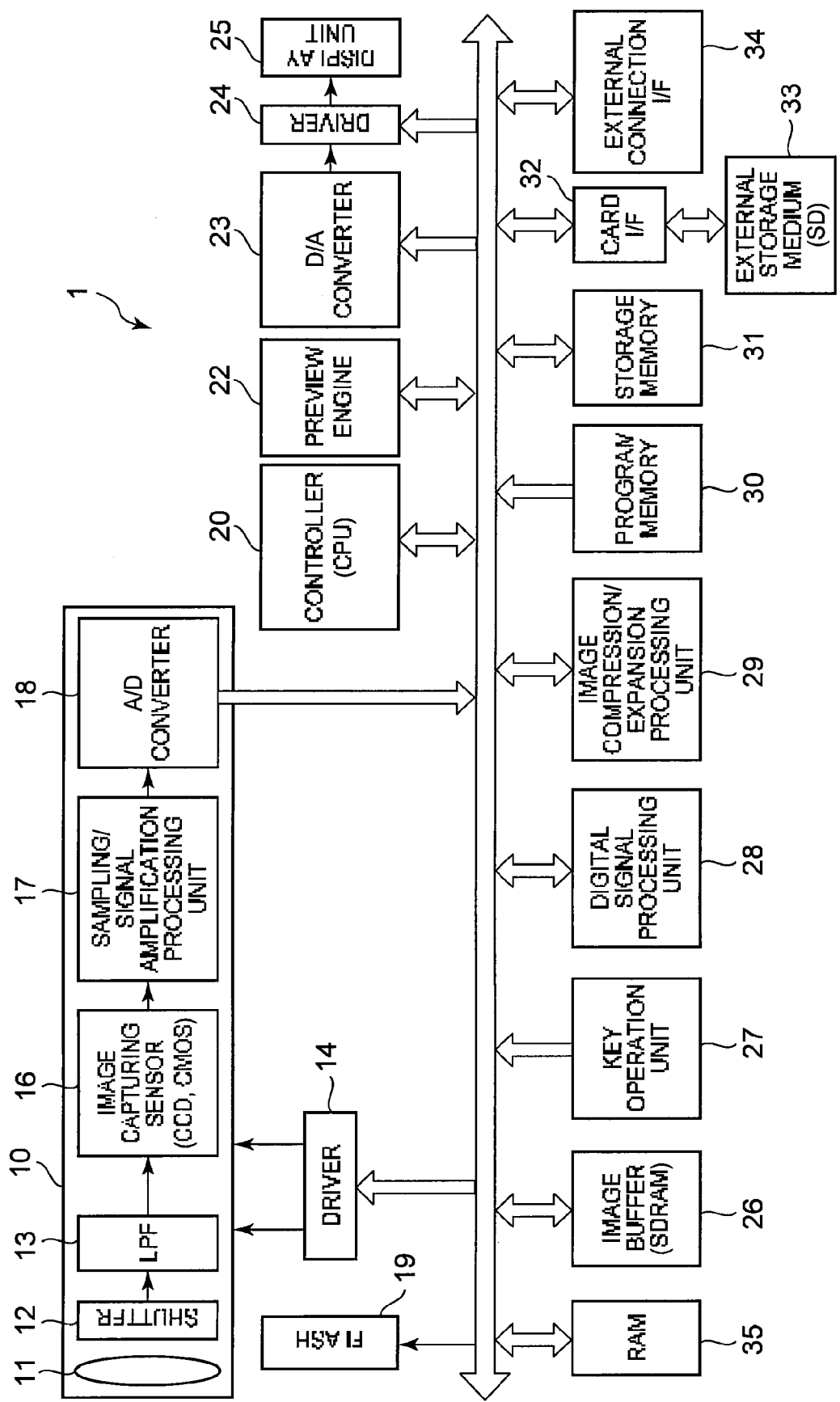
FIG. 1 is a block diagram showing an electrical configuration of a digital camera as an image capturing device related to one embodiment of the present invention.

FIG. 1 is a block diagram showing an electrical configuration of a digital camera as an image capturing device related to one embodiment of the present invention. The digital camera has, as a base operation mode, a photography subject person information registration mode, a photography mode, and a playback mode. In the photography subject person information registration mode, personal information, photography conditions, and retouching conditions and subject information as image processing conditions of a photography subject person are registered. In the photography mode, a subject is photographed. In the playback mode, an image acquired in the photography mode is played back.

The present embodiment of a digital camera 1 includes an image capturing unit 10, a driver 14, a flash 19, a controller (hereinafter, called a "CPU") 20, a preview engine 22, a D/A converter 23, a driver 24, a display unit 25 as a display unit, an image buffer 26, a key operation unit 27, a digital signal processing unit 28, an image compression/expansion processing unit 29, program memory 30, storage memory 31, a card I/F 32, an external storage medium 33, an external connection I/F 34, and RAM 35. Here, I/F is intended to mean "interface".

The image capturing unit 10 is composed of a lens 11, a shutter 12, an LPF 13, an image capturing sensor (CCD, CMOS) 16, a sampling/signal amplification processing unit 17, and an A/D converter 18. The lens 11 is an ordinary optical lens, and is composed of a lens group of aspherical lenses superimposed upon one another. The shutter 12 is a so-called "mechanical shutter," operated by a driver 14 driven by the CPU 20 when a shutter button is operated. It should be noted that, depending on the digital camera, there are cases in which a mechanical shutter is not included, and in a case of a model equipped with a collapsible lens structure and a mechanical zoom, the driver control thereof is also carried out by the driver 14. The LPF 13 is a crystal low-pass filter, and is equipped to prevent the occurrence of moiré.

The photography sensor 16 forms a subject image, and converts an intensity of light for each RGB color to a value of a current. The sampling/signal amplification processing unit 17 carries out correlated double sampling processing or signal amplification processing for controlling noise or irregular coloration. The A/D converter 18 is also called an "analog front end," and converts a sampled and amplified analog signal into a digital signal (each of the RGB or CMYG colors is converted to 12-bit data and output to the bus line). The CPU 20 controls an entirety of the digital camera 1 (image capturing device) in accordance with a program stored in the program memory to be described later.

The preview engine 22, immediately after detection of digital data representing an image captured by the image capturing unit 10 or detection of a shutter operation, carries out thinning processing for displaying on the display unit 25 digital data acquired in the image buffer 26 and digital data stored in the storage memory 31. The D/A converter 23 converts digital data that has been processed by thinning by the preview engine 22, and outputs to the driver 24 subsequently.

The driver 24 includes a buffer region for temporarily storing digital data to be subsequently displayed on the display unit 25, and drives the display unit 25 based on control signals input through the key operation unit 27 and the CPU 20. The display unit 25 is composed of a color TFT liquid crystal, an STN liquid crystal, or the like, and displays a preview image, image data after photography, a settings menu, or the like.

The image buffer 26 temporarily stores digital data representing an image captured by the image capturing unit 10 immediately after the image is captured, until transferring to the digital signal processing unit 28. The key operation unit 27 as a registration unit is composed of a shutter button; a mode selection slide switch for switching between a photography mode and a playback mode; a subject person information registration switch for starting a photography subject person information registration mode; and a conditions selection switch, a menu button, and an arrow key (confirmed when the center is depressed) for inputting photography conditions, search criteria, or the like in the photography subject person information registration mode or the playback mode.

The digital signal processing unit 28 carries out white balancing processing, color processing, gradation processing, contour emphasis, conversion from the RGB format to the YUV format, and conversion from the YUV format to the JPEG format for digital data indicative of an image captured by the image capturing unit 10. The image compression/decompression processing unit 29 performs compression encoding of digital data input through the digital signal processing unit 28 into the JPEG form, generates a video file in Motion JPEG (M-JPEG) format, converts a video file in Motion JPEG (M-JPEG) format into a video file in MPEG format, and in playback mode, decompresses a video file in JPEG format or Motion JPEG (M-JPEG) format, or MPEG format.

The program memory 30 stores various programs loaded into the CPU 20, an EV value used in the best shot function, color correction information, and the like. The storage memory 31 stores image data temporarily saved in the image buffer 26, or digital data, video data, and the like converted into various file formats. The card I/F 32 controls data exchange between an external storage medium 33 and the digital camera main unit.

The external storage medium 33 is a removable storage medium composed of a Compact Flash (registered trademark), a Memory Stick (registered trademark), an SD Card (registered trademark), or the like. The external connection I/F 34 as a communication unit is composed of a USB connector slot, a Bluetooth (registered trademark) port, a wireless USB port, an infrared port, a wireless LAN port (IEEE 802.11 series), or the like. The communication unit is connected to another digital camera or a personal computer, and is used in transmission or reception of subject person related information which includes photography conditions, retouching conditions, and the like, and photographed image data. The RAM 35 stores various parameters required for control of the CPU 20, various parameters to be used for taking photographs of night scenes (such as gain (ISO sensitivity), aperture, shutter speed, a threshold or weight for image synthesis), and the like.

Figure 2:
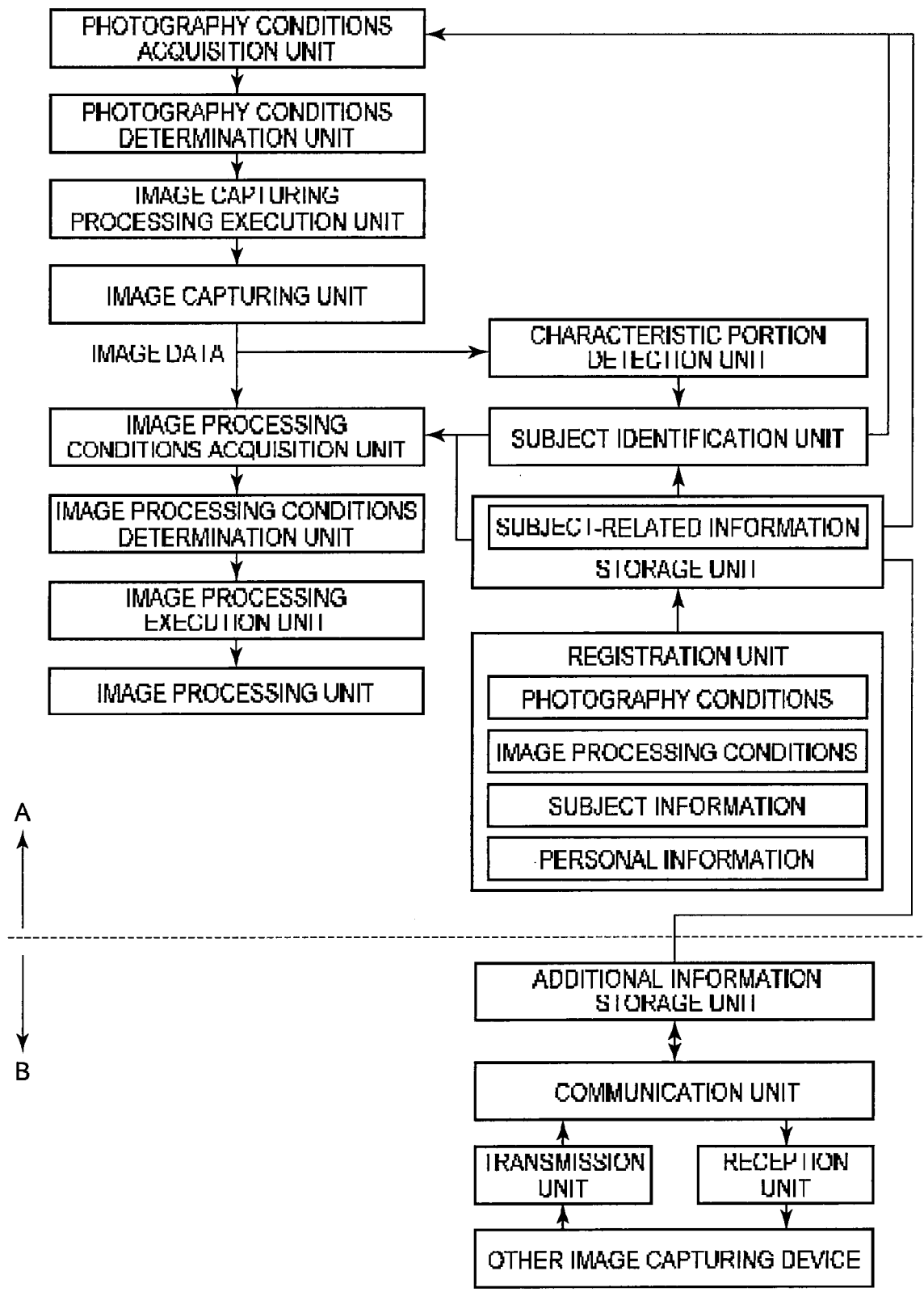
FIG. 2 is a diagram illustrating a functional constitution of the digital camera shown in FIG. 1, and owner information initial registration processing, registration information exchange processing, and photography processing.
Figure 3:
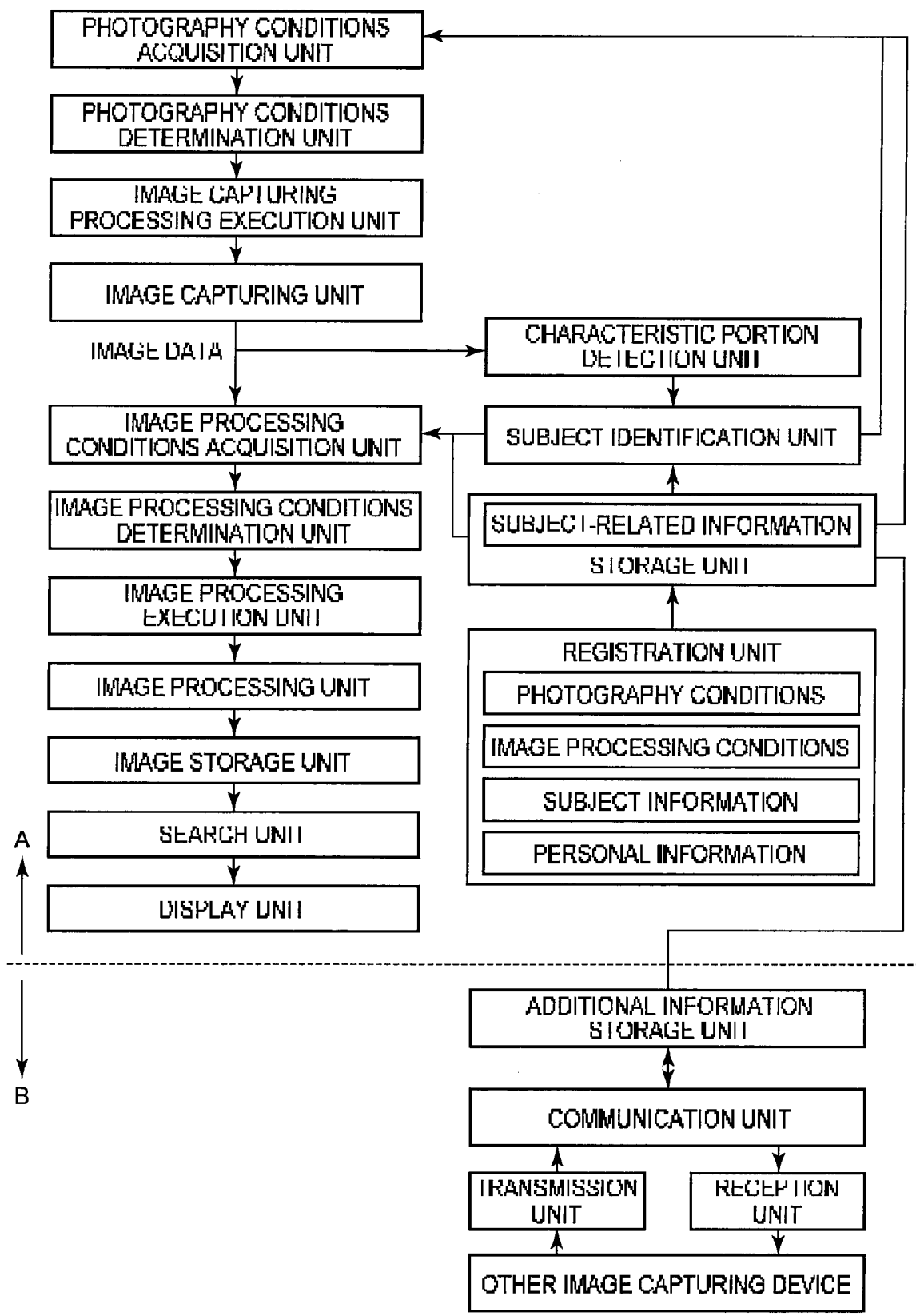
FIG. 3 is a diagram illustrating a functional configuration of the digital camera shown in FIG. 1, and playback processing.

FIG. 2 is a diagram illustrating a functional configuration of the digital camera 1, and owner information initial registration processing, registration information exchange processing, and photography processing to be performed, and FIG. 3 is a diagram illustrating playback processing. Hereinafter, with reference to FIGS. 2 and 3, such main features of the present embodiment of an image capturing device as owner information initial registration processing, registration information exchange processing, photography processing, and playback processing are described.

Owner Information Initial Registration Processing, Registration Information Exchange Processing, and Photography Processing With reference to FIG. 2, a functional configuration of the present embodiment of the digital camera 1, and owner information initial registration processing, registration information exchange processing, photography processing, and playback processing are explained. It should be added that, in FIG. 2, portions represented by the arrow A and by the arrow B can also be carried out by separate image capturing devices.

The present embodiment of the image capturing device according to the present invention comprises an image capturing unit for capturing an image of a subject, an image storage unit for storing the image captured by the image capturing unit, an image processing unit for carrying out image processing on the image captured by the image capturing unit, a registration unit for registering subject information for identifying the subject captured in the image captured by the image capturing unit and photography conditions or image processing conditions corresponding to the subject identified according to the subject information, a storage unit for storing the subject information for identifying the subject and the photography conditions or the image processing conditions corresponding to the subject identified according to the subject information, registered by the registration unit, to be associated as subject-related information, a characteristic portion detection unit for detecting a characteristic portion of the subject from an image captured by the image capturing unit, a subject identification unit for identifying a subject corresponding to a characteristic portion of the subject detected by the characteristic portion detection unit by referring to subject information stored in the storage unit, a condition acquisition unit for acquiring from the storage unit the subject-related information corresponding to the subject identified by the subject identification unit, and an image capturing processing execution unit or an image processing execution unit as a control unit for causing image capturing by the image capturing unit or image processing by the image processing unit to be carried out based on photography conditions or image processing conditions specified according to subject-related information acquired by the condition acquisition unit.

First, by the user performing an operation on a subject person photography information registration switch installed in the key operation unit 27, the CPU 20 starts an owner information initial registration mode by owner information initial registration processing, to be described later with reference to FIG. 5.

The key operation unit 27 as a registration unit registers subject information for identifying a photography subject person being captured in an image captured by the image capturing unit, image processing conditions, photography conditions, and personal information of a photography subject person identified from the subject information, and a priority order for photography conditions when photography is taken. A plurality of pieces of subject information, a plurality of image processing conditions, a plurality of photography conditions, and a plurality of pieces of personal information are registered for respective photography subject persons. By a photography subject person of operating the key operation unit 27, it is possible for the photography subject person to register desired subject information, image processing conditions, and photography conditions for each photography subject person.

The storage memory 31 as a storage unit stores the subject information, the image processing conditions, the photography conditions, and personal information of the photography subject person registered by the key operation unit 27, in association with one another, as subject-related information. The image processing conditions can include edge emphasis, brightness adjustment, hue adjustment, and the like. The photography conditions can include shutter speed, exposure time, ISO sensitivity, presence or absence of flash exposure, and the like. Furthermore, if a plurality of pieces of the subject information, a plurality of image processing conditions, and a plurality of photography conditions are registered for respective photography subject persons, then they are stored as a plurality of pieces of subject-related information. As the personal information, information related to an individual such as a name, date of birth, relationship attribute (wife, eldest son, or friend), and gender is registered.

Next, when a user operates the mode selection slide switch installed on the key operation unit 27, the CPU 20 starts photography mode by photography processing, to be described later with reference to the following FIG. 4.

The image capturing unit 10 captures a subject who is a photography subject person. The CPU 20 acquires an image captured by the image capturing unit 10, and carries out storage thereof in the image buffer 26.

The CPU 20 as a characteristic portion detection unit detects a facial portion corresponding to a characteristic portion of the photography subject person from the image which is acquired from the CPU 20 and stored in the image buffer 26. At that time, if there is a plurality of photography subject persons in the image, detection of a facial portion for each of the plurality of photography subject persons is carried out.

The CPU 20 as a subject identification unit identifies a photography subject person corresponding to the detected facial portion, by referring to the subject information stored in the storage memory 31. At this time, if there is a plurality of facial portions detected, then a photography subject person corresponding to each of the facial portions is identified for each of the photography subject persons by referring to subject information stored in the storage memory 31.

The CPU 20 as an image processing condition acquisition unit acquires image processing conditions corresponding to the identified photography subject person from the storage memory 31. At the time, if there is a plurality of photography subject persons identified by the CPU 20, image processing conditions corresponding to each of the photography subject persons are acquired from the storage memory 31.

The CPU 20 as an image processing condition determination unit, which functions as a condition determination unit, determines image processing conditions to be carried out in image processing for this time in accordance with the image processing conditions acquired.

Then, the CPU 20 as an image processing execution unit carries out image processing for an image stored in the image buffer 26 based on the image processing conditions acquired. At this time, if there is a plurality of photography subject persons identified by the CPU 20, then image processing for each portion of the photography subject persons is carried out based on image processing conditions corresponding to each of the photography subject persons.

The CPU 20 as an image processing unit carries out such image processing as edge emphasis, brightness adjustment, and hue adjustment based on the image processing conditions determined for the image stored in the image buffer 26.

The external connection I/F 34 as a communication unit is constituted by a USB connector slot, Bluetooth (registered trademark) port, Wireless USB (trademark) port, infrared port, and wireless LAN port (IEEE 802.11 series).

When connected to another digital camera through the external connection I/F 34, the CPU 20 as a transmission unit transmits subject-related information stored in the storage memory 31, as a storage unit, to the other digital camera. At this time, if many pieces of subject-related information are stored in the storage memory 31, then subject-related information is transmitted for each subject.

Furthermore, when the CPU 20 as a reception unit is connected to another digital camera through the external connection I/F 34, then subject-related information which has been registered in association with subject information, image processing conditions, and photography conditions is received by the other digital camera.

The CPU 20 as an additional information storage unit additionally stores subject information, image processing conditions, and photography conditions associated with the subject-related information received by the other digital camera by the reception unit as subject information, image processing conditions, and photography conditions registered in the digital camera itself in the storage memory 31.

The CPU 20 as a photography conditions acquisition unit which functions as a condition determination unit acquires photography conditions corresponding to a photography subject person identified by the subject identification unit from the storage memory 31. At this time, if there is a plurality of photography subject persons identified by the CPU 20, then photography conditions corresponding to each of the photography subject persons is acquired from the storage memory 31.

The CPU 20 as an image capturing processing condition determination unit determines photography conditions to be carried out in photography processing for this time according to the photography processing conditions acquired.

In addition, the CPU 20 as an image capturing processing execution unit carries out photography processing based on the photography conditions acquired. At this time, if there is a plurality of photography subjects identified by the CPU 20, then photography processing is carried out based on photography conditions corresponding to subjects having high pre-registered priority.

By carrying out of photography processing, the image capturing unit 10 sets shutter speed, exposure time, ISO sensitivity, and the presence or absence of flash exposure based on the determined photography conditions, and carries out photography.

Playback Processing

With reference to FIG. 3, a functional configuration of the present embodiment of the digital camera 1 and playback processing to be performed are explained. It should be noted that elements redundant with those described with reference to the functional configuration diagram of FIG. 2 are omitted from description. Furthermore, in FIG. 3, portions indicated by the arrow A and by the arrow B can be carried out by separate image capturing devices.

First, by a user operating a mode selection slide switch installed on the key operation unit 27, the CPU 20 starts playback mode by playback processing, to be described later with reference to FIG. 8.

The storage memory 31 as an image storage unit stores a plurality of images captured by the image capturing unit to which personal information has been added by a personal information addition unit.

The CPU 20 as a search unit searches for an image as an object from a plurality of images stored in the storage memory 31, by referring to subject-related information associated by the storage unit. More specifically, by a user operating the key operation unit 27, when a name is entered as a part of personal information for a search criterion, then an image to which personal information has been added that matches the name is searched.

The display portion 25 as a display unit displays an image matching personal information searched for by the search unit from a plurality of images stored in the storage memory 31.

Basic Flow

Figure 4:
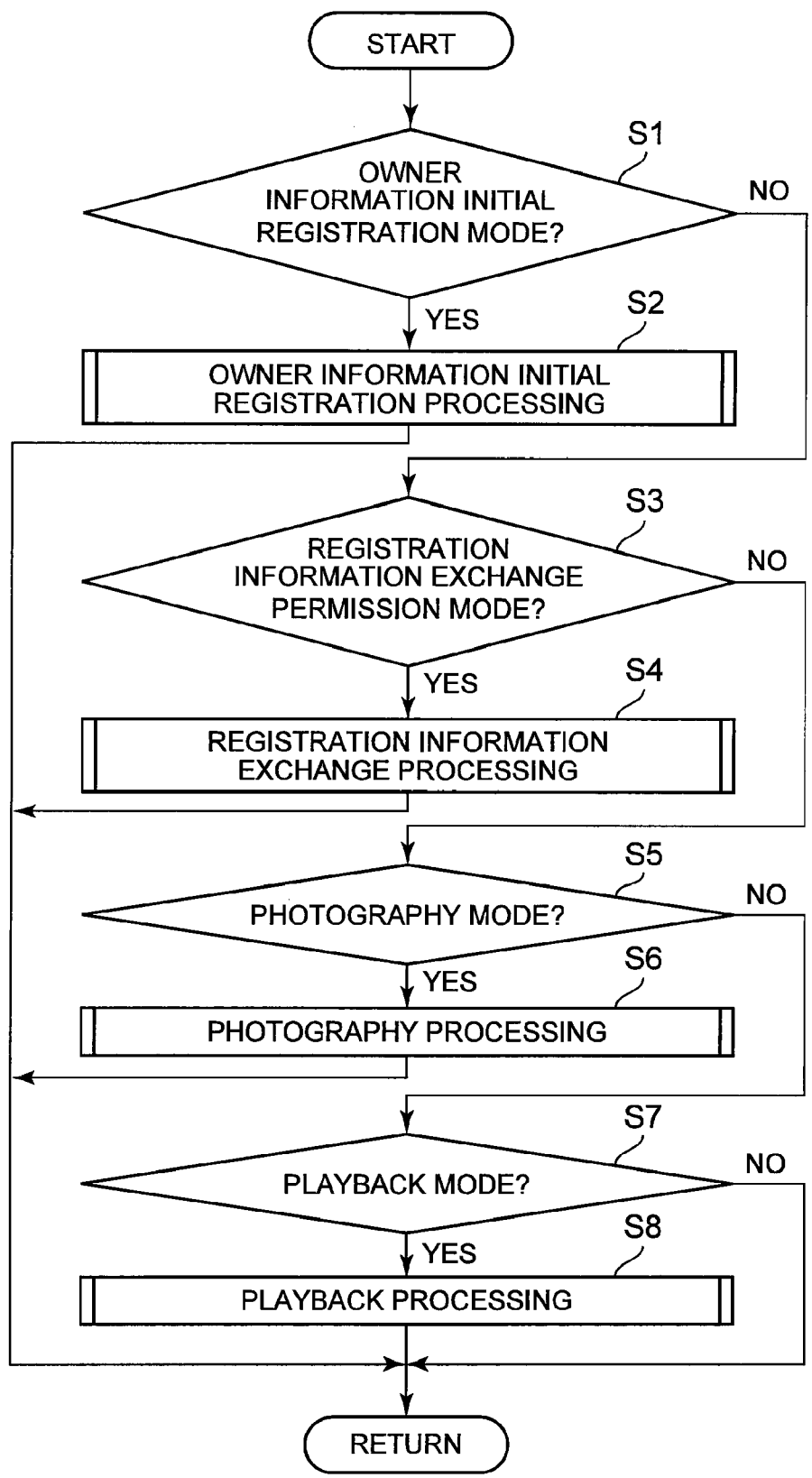
FIG. 4 is a flowchart illustrating basic processing carried out by the digital camera shown in FIG. 1.

FIG. 4 is a flowchart showing basic processing of the digital camera 1. By changing various modes after the operation of a mode selection slide switch installed on the key operation unit 27 and a photography subject person information registration switch, the CPU 20 reads out from the RAM 35 a program for executing processing, to be described later with reference to the flowcharts shown in FIGS. 4 to 8. In accordance with the program, the CPU 20 executes various processing as described with reference to the flowcharts shown in FIGS. 4 to 8.

Basic Processing

First, the CPU 20 determines whether the current operation mode is the owner information initial registration mode or not (Step S1). In this processing, after the owner information initial registration switch on the key operation unit 27 is operated by the user, it is determined whether the owner information initial registration mode has been started. If it is determined that the current operation mode is the owner information initial registration mode, then owner information initial registration processing, to be described later with reference to FIG. 5, is carried out (Step S2). When the processing is complete, the above-mentioned determination is repeated until the mode is changed again to any of the modes.

Figure 6:
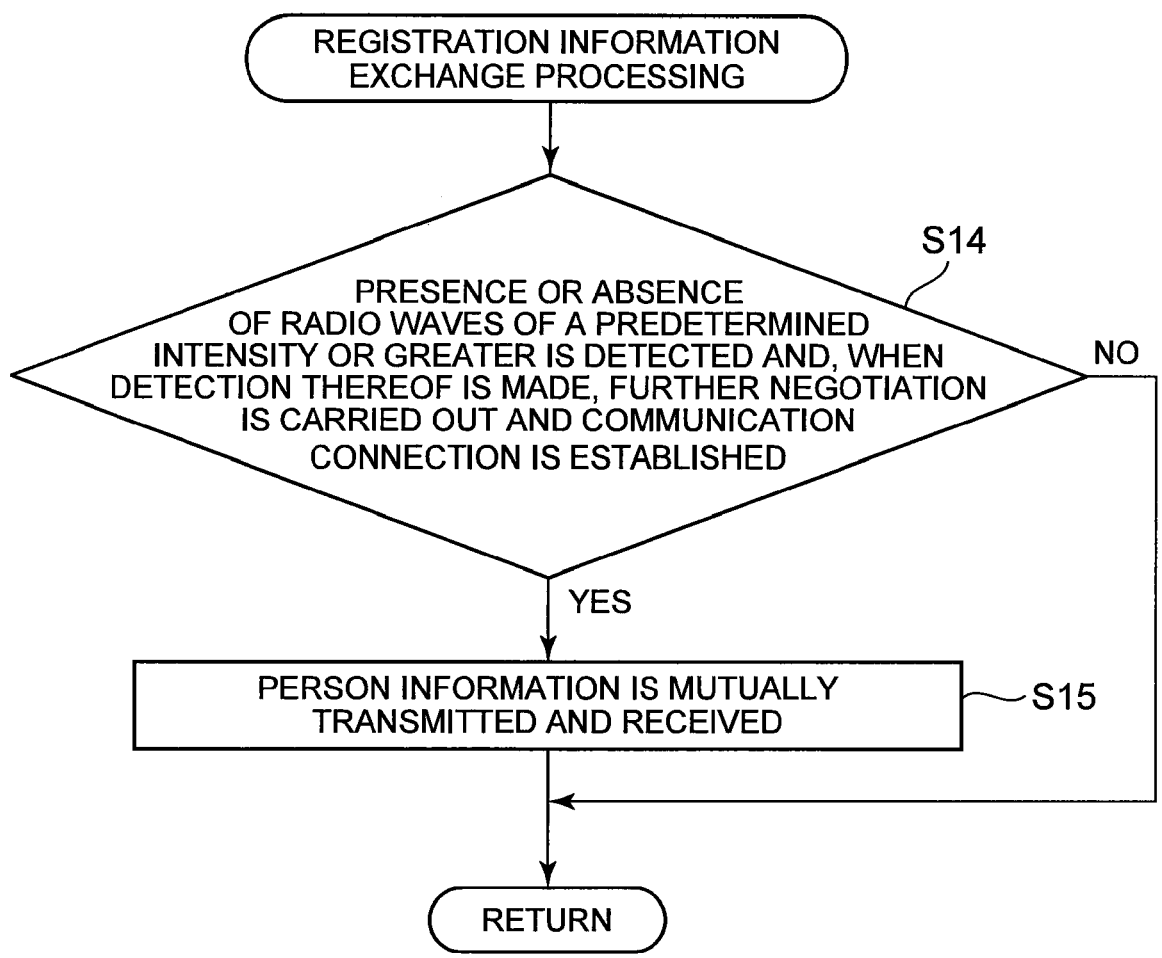
FIG. 6 is a flowchart illustrating registration information exchange processing carried out by the digital camera shown in FIG. 1.

If it is determined that the current operation mode is not the owner information initial registration mode, then it is determined whether the current operation mode is the registration information exchange permission mode, which permits exchange of the registration information (Step S3). If the registration information exchange permission mode is set, then registration information exchange processing, to be described later with reference to FIG. 6, is carried out (Step S4).

Figure 7:
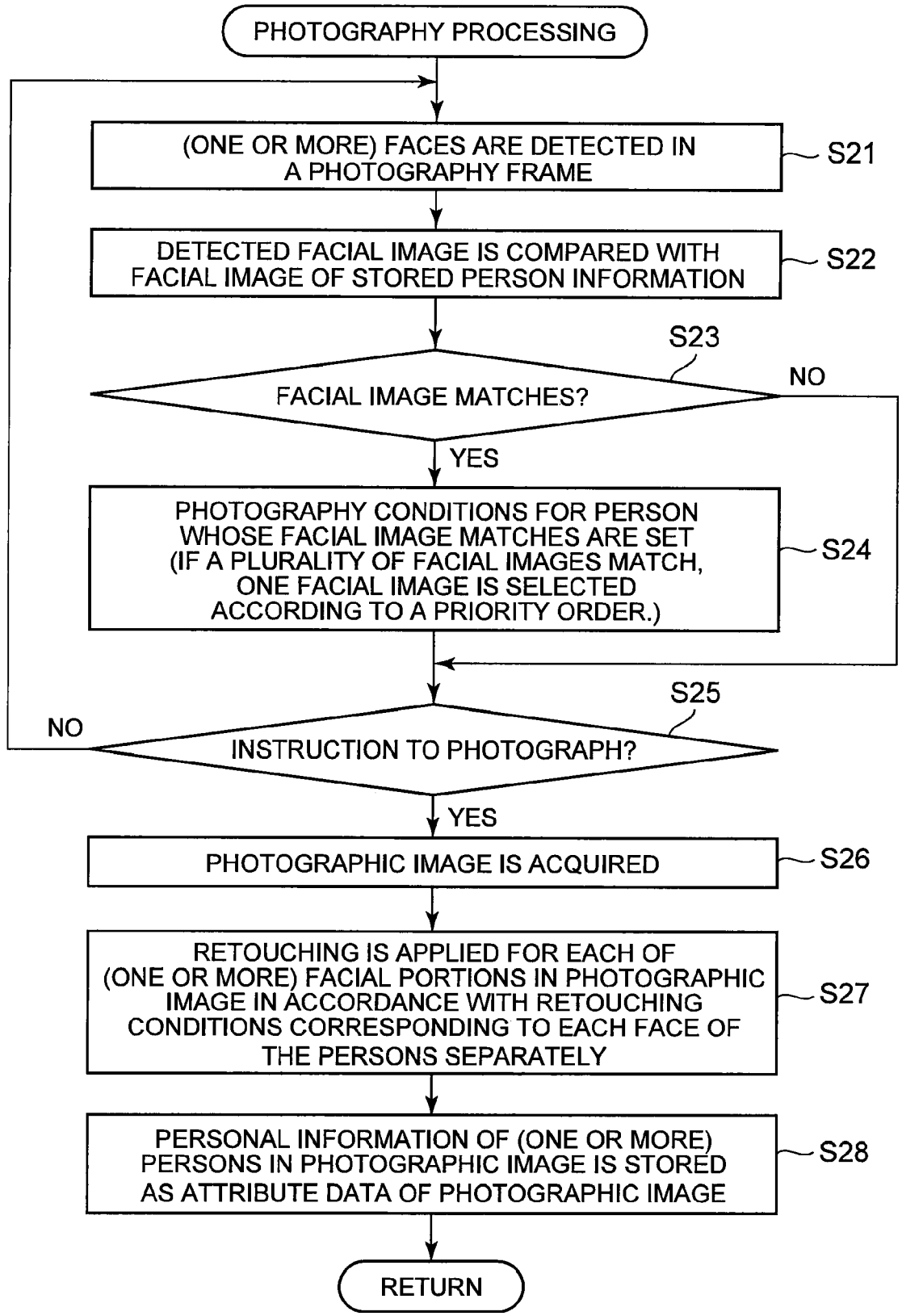
FIG. 7 is a flowchart illustrating photography processing carried out by the digital camera shown in FIG. 1.

Next, it is determined whether the photography mode has been begun (Step S5). If it is determined that the current operation mode is the photography mode, then the photography processing, to be described later with reference to FIG. 7, is carried out (Step S6).

Next, it is determined whether the current operation mode is the playback mode or not (Step S7). In this processing, it is determined whether the playback mode has been started or not, as a result of operating the mode selection slide switch in accordance with an operation of the user. If it is determined that the current operation mode is the playback mode, then the playback processing, to be described later with reference to FIG. 8, is carried out (Step S8). When the processing is complete, the above-mentioned determination is repeated until the mode is changed again to any of the modes. Furthermore, even if it is determined that the current operation mode is not the playback mode, the above-mentioned determination is repeated until the mode is changed to any of the modes.

Owner Information Initial Registration Processing

Figure 5:
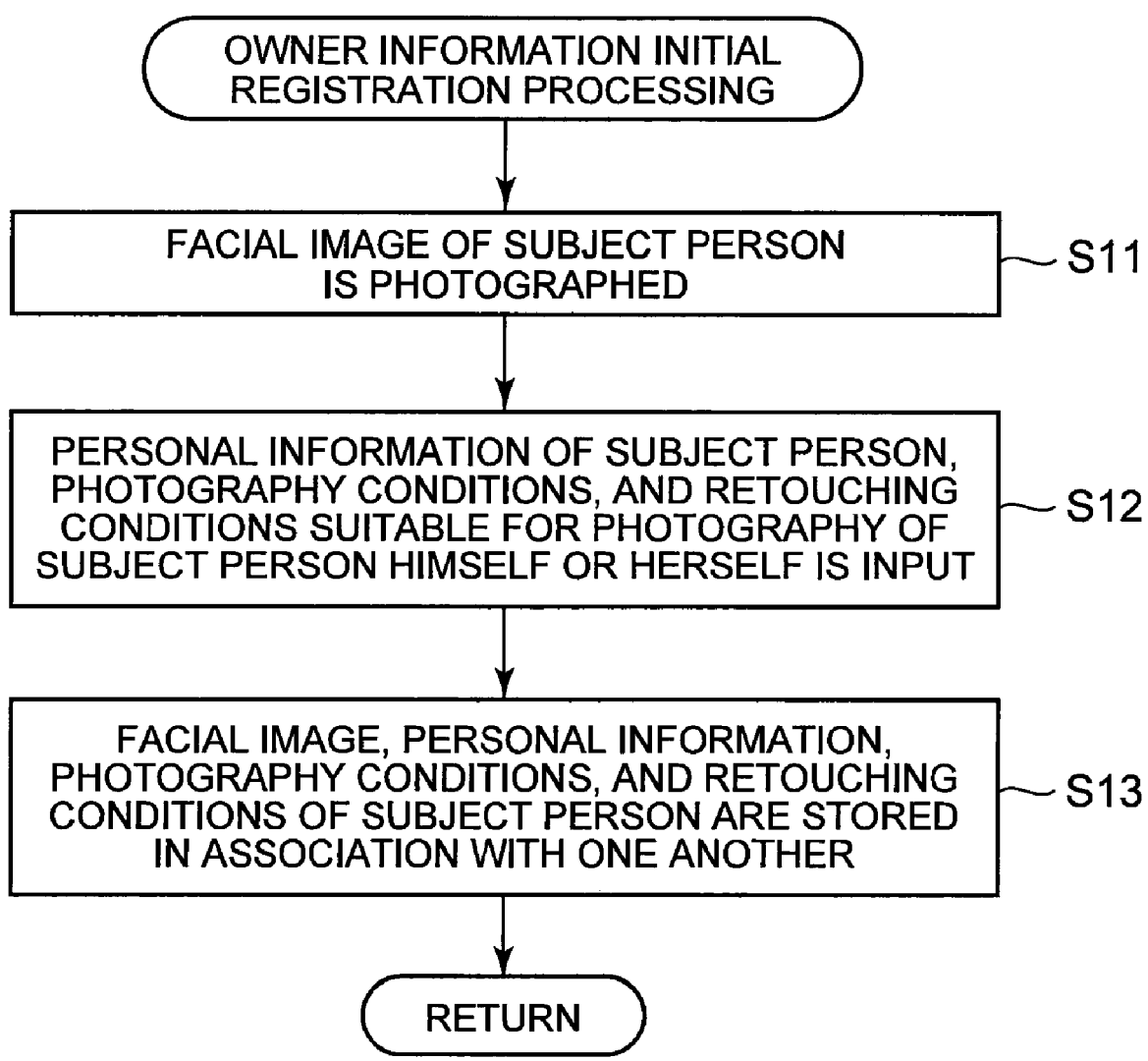
FIG. 5 is a flowchart illustrating owner information initial registration processing carried out by the digital camera shown in FIG. 1.

With reference to a flowchart of the owner information initial registration processing shown in FIG. 5, the operation in the owner information initial registration mode carried out under the control of the CPU 20 is described.

First, the CPU 20 controls the image capturing unit 10 to photograph a facial image of the owner (Step S11). Next, the CPU 20 inputs personal information of the owner, photography conditions and retouching conditions suitable for photography of the owner himself or herself as image processing conditions, in response to an operation of the key operation unit 27 by a user (Step S12). Next, the facial image, personal information, photography conditions, and retouching conditions of the owner are stored in the storage memory 31 to be in association with one another, as information of a person (Step S13). When the processing is complete, the owner information initial registration processing is terminated.

Registration Information Exchange Processing

With reference to a flowchart of the registration information exchange processing shown in FIG. 6, operation in the registration information exchange permission mode carried out under the control of the CPU 20 is described.

The CPU 20 controls a wireless communication I/F functioning as an external connection I/F 34, detects the presence or absence of radio waves of a predetermined intensity or greater (for example, for a camera of the same model, a presence within 5 m is detected), and if the CPU 20 makes a detection thereof, further negotiation is carried out, and a communication connection is established with another camera having a function of sharing information of a person (Step S14). If it is not possible to establish a communication connection with another camera having a function of sharing information of a person, then the registration information exchange processing is terminated. On the other hand, if a communication connection with another camera having a function of sharing information of a person is established, then the CPU 20 controls the wireless communication I/F, mutually transmits and receives information of a person initially stored in each camera by the above-mentioned owner information initial registration processing, and carries out storage thereof in the storage memory 31 (Step S15). When the processing is terminated, the registration information exchange processing is terminated.

It should be noted that it is possible to use infrared waves, a wireless LAN, or the like for the wireless communication I/F, and that, instead of a wireless communication I/F, it is also acceptable to use such a wired communication I/F as USB or the like.

Photography Processing

With reference to a flowchart of photography processing shown in FIG. 7, the operation in the photography mode carried out under the control of the CPU 20 is described.

First, the CPU 20 detects one or more faces from within a photography frame of an image stored in the image buffer 26 (Step S21). Next, the detected facial image is compared with a facial image of the information of a person stored in the storage memory 31 (Step S22).

Subsequently, the CPU 20 compares the detected facial image with each of the facial images of the information of the persons stored, and determines whether or not the facial image matches (Step S23). If it is determined that the facial image matches as a result of comparing the detected facial image with each of the facial images of the information of the persons stored, then the CPU 20 sets photography conditions for the person whose facial image matches (Step S24). In this case, if a plurality of facial images match, one facial image is selected from among them in accordance with a priority order.

If it is determined after Step S24 or during Step S23 that the facial image does not match as a result of comparing the detected facial image with each of the facial images of information of persons stored, then the CPU 20 determines whether or not there has been an instruction to photograph from the key operation unit 27 (S25). If it is determined that there has been no instruction to photograph, then processing returns to Step S21. On the other hand, if it is determined that there has been an instruction to photograph, then the image capturing unit 10 is controlled so as to carry out photography in accordance with the photography conditions set in the earlier step, and to acquire a photographic image for storage (S26).

As can be understood from the foregoing description, the CPU 20 repeats the processing from Step S21 to Step S25 while causing the display unit 25 to display images successively photographed by the image capturing unit 10 as live-view images.

It should be noted that, if there has been an instruction to photograph from the key operation unit 27 in the above Step S25, although the control proceeds to Step S26 where the CPU 20 acquires a photographic image for storage, the processing in Step S26 may be modified. For example, if it is determined that the facial image does not match in Step S23, even though there may have been no instruction to photograph from the key operation unit 27, the control may proceed to Step S26 where a photographic image is acquired for storage.

Next, based on retouching conditions stored in the storage memory 31, the CPU 20 applies retouching for the one or more facial portions in the photographic image in accordance with the retouching conditions (image processing conditions) corresponding to each of the faces of the persons independently (S27). Next, the CPU 20 stores personal information of the one or more persons in the photographic image as attribute data of the photographic image in the storage memory 31 (S28). When this processing is complete, the photography processing is terminated.

Playback Processing

Figure 8:
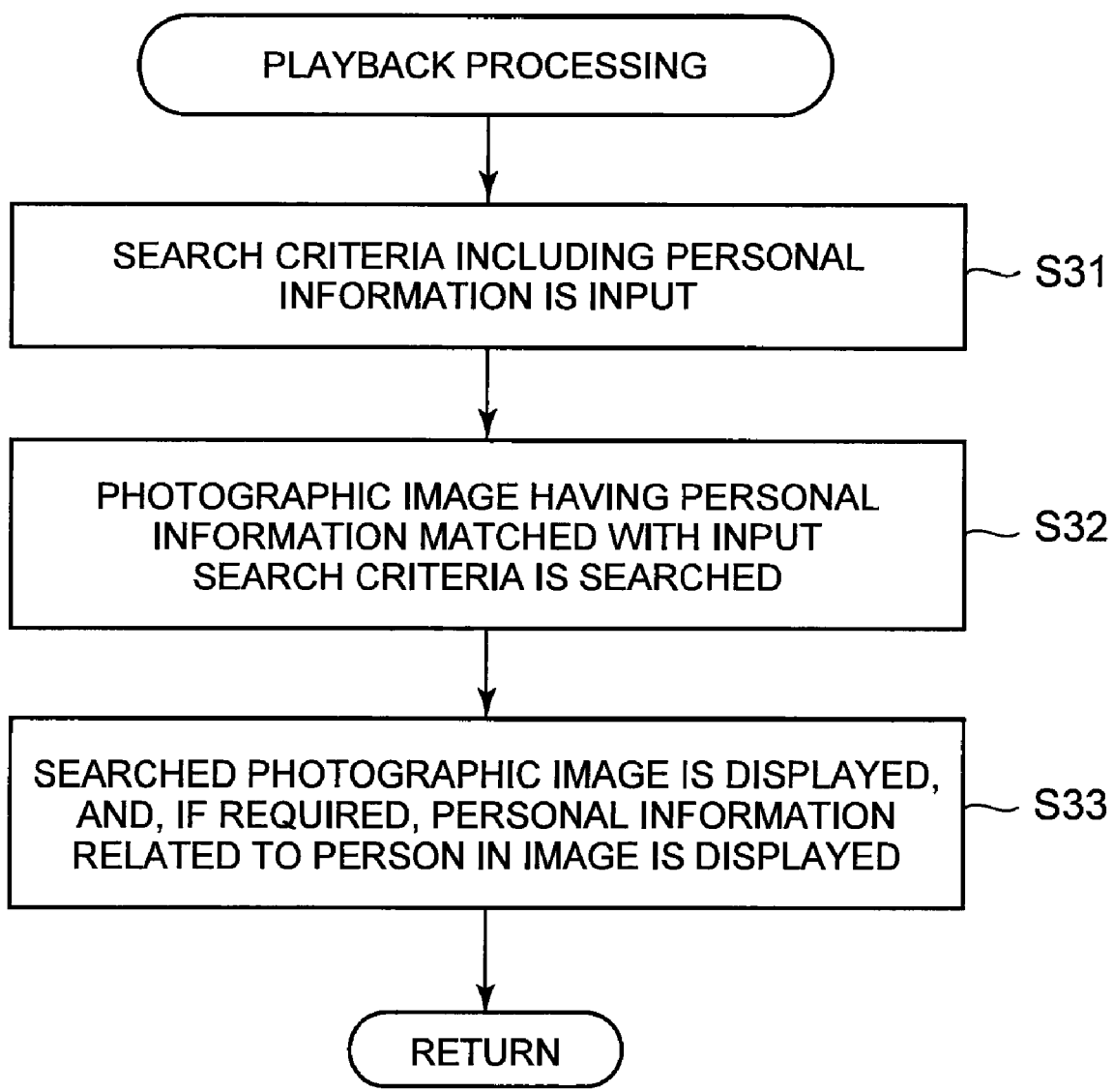
FIG. 8 is a flowchart illustrating playback processing carried out by the digital camera shown in FIG. 1.

With reference to a flowchart of playback processing shown in FIG. 8, the operation in the playback mode carried out under the control of the CPU 20 is described.

First, search criteria including personal information is input (S31). More specifically, the CPU 20 inputs search criteria including personal information in accordance with an operation of the key operation unit 27 by a user. Next, the CPU 20 searches for a photographic image having personal information matched with a search criteria input from the storage memory 31 (S32). Then, the CPU 20 controls the display unit 25 to display the searched photographic image, while displaying personal information related to a person in the image as required (S33). When this processing is complete, the playback processing is terminated.

As described above, in the present embodiment, photography conditions or image processing conditions corresponding to a subject identified by a subject identification unit are acquired from the storage memory 31, and based on the acquired photography conditions or image processing conditions, photography by the image capturing unit or image processing by the image processing unit is carried out, and therefore, it is possible to easily carry out photography with photography conditions in accordance with the individual preferences of a subject person, or to carry out photography or image processing with photography conditions or image processing conditions in accordance with the individual preferences of a subject person for the captured image. As a result, photography or image processing with parameters of photography conditions or image processing conditions in accordance with the individual preferences of subject persons is carried out automatically, and therefore, it is possible to easily acquire a photographic image corresponding to the individual preferences of subject persons just by pre-registering preferences of photography conditions or image processing conditions of each of the subjects.

Furthermore, in the present embodiment, subject information for identifying a subject, photography conditions or image processing conditions of the subject identified according to the subject information are stored to be associated with one another as subject-related information by the storage unit, and transmitted to another image capturing device by a communication unit. As a result, even if a person himself or herself is to be photographed by a camera of another person, it is possible to carry out photography or image processing with his or her preferred photography conditions or image processing conditions as registered by his or her own digital camera.

Furthermore, in the present embodiment, a reception unit for receiving subject-related information from another image capturing device by a communication unit is provided, and subject information and image processing information related to the subject-related information received by the reception unit are additionally stored in the storage unit as image processing conditions of a subject identified according to subject information for identifying a subject and image processing conditions of the subject identified according to the subject information, registered by the registration unit. As a result, even if another person is photographed by one's own camera, it is possible to carry out image processing of an image photographed according to image processing conditions preferred by another person registered with a digital camera of the other person.

Furthermore, in the present embodiment, subject information for identifying the subject, image processing conditions of a subject identified by the subject information, and photography conditions of the subject identified by the subject information are stored in the storage unit 31 to be in association with one another as subject-related information, photography conditions corresponding to the subject identified by the subject identification unit is acquired from the storage memory 31, and photography is carried out by the image capturing unit based on the acquired photography conditions. As a result, even if a subject which is an object of photography is changed, it is possible to easily carry out photography according to photography conditions in accordance with preferences of the subject. Therefore, photography can be automatically carried out with parameters of photography conditions according to preferences of an individual who becomes a subject, and therefore, by just pre-registering photography conditions preferred by each of the subjects, it is possible to easily carry out photography processing according to the preferences of individual subjects.

Furthermore, in the present embodiment, the registration unit registers subject information for identifying a subject in an image acquired, image processing conditions of a subject identified by subject information, photography conditions of a subject identified by the subject information, and personal information relating to an individual of a subject identified according to the subject information. In addition, the storage memory 31 stores subject information for identifying a subject, image processing conditions of a subject identified according to the subject information, photography conditions of a subject identified according to the subject information, and personal information relating to an individual of a subject identified according to the subject information, to be in association with one another as subject-related information. The CPU 20 searches for an image to be an object from among a plurality of images stored in the image storage unit, by referring to subject-related information associated by the storage memory 31. Also, the display unit 25 displays an image searched for by the CPU 20. As a result, if there is a registered image among the images captured by the image capturing device, it is possible to add such personal information as a name, image capture date, age, and relationship attribute to the image captured. Furthermore, by making it possible to easily carry out a search based on the personal information, when another person who is not a family member is photographed, the name or date of birth of the other person who has become a subject of the photographed picture is stored as personal information and can be used later for automatic classification of an image, and thus, management of images becomes easy.

Furthermore, in the present embodiment, characteristic portions of each of a plurality of subjects are detected from an image acquired, a plurality of subjects corresponding to the characteristic portions of each of the plurality of subjects detected are identified by referencing a plurality of pieces of subject information stored in the storage memory 31, and the image processing conditions corresponding to each of the plurality of subjects identified are acquired from the storage memory 31, and based on each of the image processing conditions acquired, image processing is carried out for each of the subjects corresponding in the image. As a result, even if a plurality of subjects exist in the image captured, it is possible to carry out image processing with image processing conditions according to the preferences of each of individual subjects. Therefore, even if a plurality of subjects exist in an image with parameters of image processing conditions corresponding to the preferences of individuals who have become the subjects, image processing is carried out automatically, and therefore, it is possible to easily carry out image processing with conditions preferred by each of the subject individuals just by pre-registering image processing conditions preferred by each of subjects.

What is claimed is:

1. An image capturing device, comprising:
    an image capturing unit for capturing an image of a subject;
    a registration unit for newly registering subject information for identifying the subject in the image, and photography conditions or image processing conditions corresponding to the subject identified according to the subject information;
    a storage unit for storing the subject information, and the photography conditions or the image processing conditions, newly registered by the registration unit, to be in association with one another, as subject-related information;
    a characteristic portion detection unit for detecting a characteristic portion of a subject in an image captured by the image capturing unit;
    a subject identification unit for identifying the subject corresponding to the characteristic portion detected by the characteristic portion detection unit, by referring to the subject information stored in the storage unit;
    a condition acquisition unit for acquiring, from the storage unit, the photography conditions or the image processing conditions corresponding to the subject identified by the subject identification unit; and a control unit for carrying out image capturing by the image capturing unit based on the photography conditions acquired by the condition acquisition unit, or for causing image processing to be carried out on a captured image based on the image processing conditions acquired by the condition acquisition unit, wherein the storage unit stores the subject-related information as subject-related information corresponding to the image capturing device itself, and wherein the image capturing device further comprises:
  a communication unit for communicating with another image capturing device; and
  a transmission unit for transmitting the subject-related information corresponding to the image capturing device itself to the other image capturing device via the communication unit.

2. An image capturing device, as set forth in claim 1, further comprising:
a reception unit for receiving subject-related information from the other image capturing device via the communication unit; and
an additional information storage unit for additionally storing the subject-related information received by the reception unit from the other image capturing device as subject-related information corresponding to the other image capturing device in the storage unit.

3. An image capturing device, as set forth in claim 1, wherein, in a case in which a subject in an image captured by the image capturing unit is identified by the subject identification unit, the control unit sets the photography conditions acquired by the condition acquisition unit.

4. An image capturing device, as set forth in claim 2, further comprising an image storage unit for storing an image captured by the image capturing unit,
wherein, in a case in which a subject in the image captured by the image capturing unit is identified by the subject identification unit, the control unit carries out image processing on the image based on the image processing conditions acquired by the condition acquisition unit, and causes the image storage unit to store the image on which the image processing has been performed.

5. An image capturing device, as set forth in claim 2, wherein:
the registration unit registers subject information for identifying the subject in the image captured by the image capturing unit, the image processing conditions of the subject identified according to the subject information, and the photography conditions of the subject identified according to the subject information;
the storage unit stores the subject information for identifying the subject in the image captured by the image capturing unit, the image processing conditions of the subject identified according to the subject information, and the photography conditions of the subject identified according to the subject information registered by the registration unit, to be in association with one another, as the subject-related information; and
the control unit performs image capturing by the image capturing unit based on the photography conditions specified by the subject-related information acquired by the condition acquisition unit, and causes image processing to be carried out on the captured image, based on the image processing conditions specified by the subject-related information.

6. An image capturing device, as set forth in claim 5, further comprising:
an image storage unit for storing a plurality of images on which image processing has been performed by the control unit;
a search unit for searching for an image to be an object from among the plurality of images stored in the image storage unit; and
a display unit for displaying the image searched for by the search unit,
wherein:
the registration unit further registers personal information relating to an individual of the subject identified according to the subject information,
the storage unit stores the subject information, the image processing conditions, the photography conditions, and the personal information, to be associated with one another, as the subject-related information, and
the search unit searches for an image to be an object from among a plurality of images stored by the image storage unit, by referring to the subject-related information associated in the storage unit.

7. An image capturing device, as set forth in claim 1, wherein:
the image capturing unit captures a plurality of subjects in an image,
the registration unit registers a plurality of pieces of subject information each for identifying a subject in the image captured by the image capturing unit, and a plurality of image processing conditions of the plurality of subjects respectively identified according to the subject information for the plurality of subjects,
the storage unit stores the plurality of pieces of subject information for identifying the subjects and the image processing conditions of the subjects identified according to the subject information, registered by the registration unit,
the characteristic portion detection unit detects a characteristic portion of each of a plurality of subjects from an image captured by the image capturing unit,
the subject identification unit identifies the plurality of subjects corresponding to the characteristic portions, respectively, detected by the characteristic portion detection unit, by referring to the plurality of pieces of the subject information stored in the storage unit,
the condition acquisition unit acquires the image processing conditions corresponding to each of the plurality of subjects identified by the subject identification unit from the storage unit, and
the control unit, based on each of the image processing conditions acquired by the condition acquisition unit, carries out image processing on each of the corresponding subjects in the image.

8. An image capturing method for an image capturing device, the method comprising:
an image capturing step of capturing an image of a subject;
a registration step of newly registering subject information for identifying the subject in the image, and photography conditions or image processing conditions corresponding to the subject identified according to the subject information;
a storage step of storing the subject information, and the photography conditions or the image processing conditions newly registered in the registration step, to be in association with one another, as subject-related information;

a characteristic portion detection step of detecting a characteristic portion of a subject in a captured image;
a subject identification step of identifying the subject corresponding to the characteristic portion detected in the characteristic portion detection step, by referring to the subject information stored in the storage step;
a condition acquisition step of acquiring, from the subject-related information stored in the storage step, the photography conditions or the image processing conditions corresponding to the subject identified in the subject identification step; and
a control step of carrying out image capturing based on the photography conditions acquired in the condition acquisition step, or causing image processing to be carried out on a captured image based on the image processing conditions acquired in the condition acquisition step,
wherein the storage step comprises storing the subject-related information as subject-related information corresponding to the image capturing device itself,
wherein the method further comprises a transmission step of transmitting the subject-related information corresponding to the image capturing device itself to another image capturing device.

9. A non-transitory storage medium having stored therein a program that enables a computer provided with an image capturing device to function as units comprising:
an image capturing unit for capturing an image of a subject;
a registration unit for newly registering subject information for identifying the subject, and photography conditions or image processing conditions corresponding to the subject identified according to the subject information;
a storage unit for storing the subject information, and the photography conditions or image processing conditions, newly registered by the registration unit, in association with one another, as subject-related information;
a characteristic portion detection unit for detecting a characteristic portion of a subject from an image captured by the image capturing unit;
a subject identification unit for identifying the subject corresponding to the characteristic portion detected by the characteristic portion detection unit, by referring to the subject information stored in the storage unit;
a condition acquisition unit for acquiring, from the storage unit, the photography conditions or the image processing conditions corresponding to the subject identified by the subject identification unit; and
a control unit for carrying out image capturing by the image capturing unit based on the photography conditions acquired by the condition acquisition unit, or for causing image processing to be carried out on a captured image based on the image processing conditions acquired by the condition acquisition unit,
wherein the storage unit stores the subject-related information as subject-related information corresponding to the image capturing device itself, and
wherein the program enables the computer to function as further units comprising:
a communication unit for communicating with another image capturing device; and
a transmission unit for transmitting the subject-related information corresponding to the image capturing device itself to the other image capturing device via the communication unit.

* * * * *